(12) United States Patent
Dart et al.

(10) Patent No.: US 10,984,179 B2
(45) Date of Patent: Apr. 20, 2021

(54) INTELLIGENT OBJECT MOVEMENT

(71) Applicant: Microsoft Technology Licensing, LLC, Redmond, WA (US)

(72) Inventors: Anthony Dart, Sammamish, WA (US); Cooper Clauson, Seattle, WA (US); Mark Phair, Redmond, WA (US); March Rogers, Bothell, WA (US); Joshua Baber, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 294 days.

(21) Appl. No.: 15/870,240

(22) Filed: Jan. 12, 2018

(65) Prior Publication Data
US 2019/0171700 A1 Jun. 6, 2019

Related U.S. Application Data

(60) Provisional application No. 62/594,426, filed on Dec. 4, 2017.

(51) Int. Cl.
*G06F 17/20* (2006.01)
*G06F 40/166* (2020.01)
(Continued)

(52) U.S. Cl.
CPC .......... *G06F 40/166* (2020.01); *G06F 3/0482* (2013.01); *G06F 3/0484* (2013.01);
(Continued)

(58) Field of Classification Search
CPC .. G06F 3/04883; G06F 40/166; G06F 3/0482; G06F 3/0484; G06F 3/0486; G06T 13/80; G06T 2200/24
See application file for complete search history.

(56) References Cited

U.S. PATENT DOCUMENTS

| | | | | |
|---|---|---|---|---|
| 5,844,547 A | * | 12/1998 | Minakuchi | G06F 3/0481 345/173 |
| 7,345,675 B1 | * | 3/2008 | Minakuchi | G06F 3/0485 345/156 |

(Continued)

OTHER PUBLICATIONS

"International Search Report and Written Opinion Issued in PCT Application No. PCT/US18/062153", dated Feb. 13, 2019, 12 Pages.

*Primary Examiner* — Mohammed H Zuberi

(57) ABSTRACT

Non-limiting examples described herein relate to representation of intelligent object movement. Examples described herein replace pre-canned object movement actions and provide new data transformations that better emphasize context related to object movement. An action for placement of a data object may be received. Non-limiting examples of actions comprise a movement of a data object or an object insertion of one or more data objects. The action is analyzed using an object movement data model that evaluates a context for placement of the data object. Insertion characteristics are applied to the data object based on analysis by the object movement data model. A movement of the data object is surfaced, through a user interface, based on the applied insertion characteristics. An exemplary surfaced movement presents a motion animation of the data object from an initial position within the digital canvas to a resting position within the digital canvas.

20 Claims, 11 Drawing Sheets

(51) Int. Cl.
*G06T 13/80* (2011.01)
*G06F 3/0482* (2013.01)
*G06F 3/0484* (2013.01)
*G06F 3/0486* (2013.01)

(52) U.S. Cl.
CPC ............ *G06F 3/0486* (2013.01); *G06T 13/80* (2013.01); *G06T 2200/24* (2013.01)

(56) References Cited

U.S. PATENT DOCUMENTS

| | | | | |
|---|---|---|---|---|
| 8,164,596 | B1* | 4/2012 | Bech | G06T 13/00 345/473 |
| 10,339,721 | B1* | 7/2019 | Dascola | G06F 1/1643 |
| 2008/0055315 | A1* | 3/2008 | Ducharme | G06T 13/00 345/473 |
| 2008/0129739 | A1* | 6/2008 | Moravanszky | G06T 13/20 345/474 |
| 2011/0093805 | A1* | 4/2011 | Ekhager | G06Q 10/10 715/769 |
| 2011/0163944 | A1* | 7/2011 | Bilbrey | H04L 67/18 345/156 |
| 2011/0185321 | A1* | 7/2011 | Capela | G06F 3/0488 715/863 |
| 2012/0249443 | A1* | 10/2012 | Anderson | G06F 3/04883 345/173 |
| 2014/0071069 | A1* | 3/2014 | Anderson | A63F 13/06 345/173 |
| 2015/0149967 | A1* | 5/2015 | Bernstein | G06F 3/0488 715/854 |
| 2017/0357317 | A1* | 12/2017 | Chaudhri | G06F 3/016 |
| 2018/0300036 | A1* | 10/2018 | Bhatt | G06F 3/0486 |
| 2018/0336717 | A1* | 11/2018 | Liu | G06T 13/00 |

* cited by examiner

100

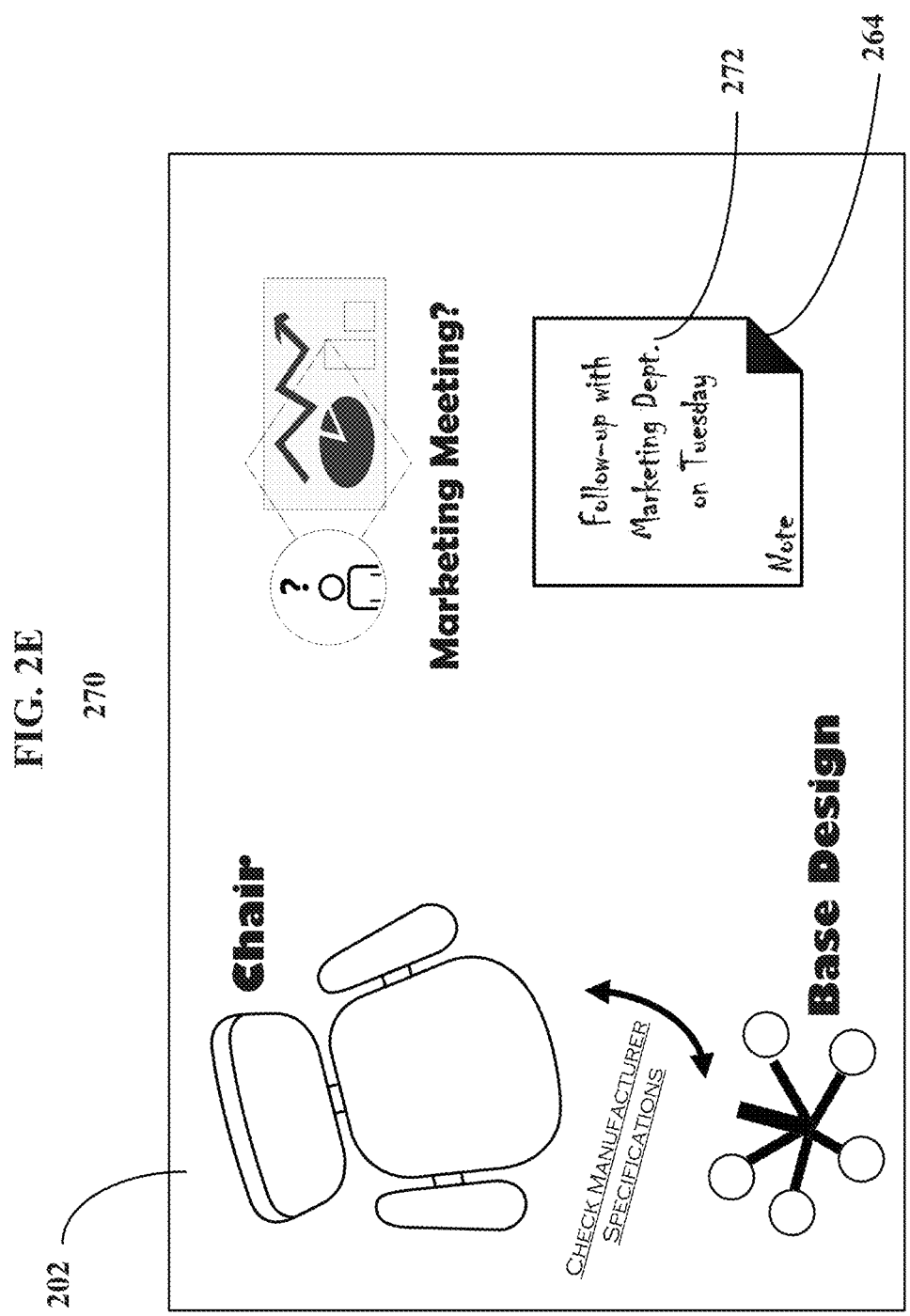

INTELLIGENT OBJECT MOVEMENT

CROSS-REFERENCE TO RELATED APPLICATIONS

This application claims priority to U.S. Provisional Patent Application No. 62/594,426, entitled "INTELLIGENT OBJECT INSERTION IN COLLABORATIVE ENVIRONMENT", filed on Dec. 4, 2017, which is incorporated by reference herein in its entirety.

BACKGROUND

In real life, object movement may vary on an object to object basis due to positioning, force, size/mass, gravity, friction, etc. For instance, a piece of paper may fall to the ground very differently from a textbook. However, present applications/services are not configured to surface object movement actions that are contextually relevant for a processing state of the application/service. Thus, processing devices and application/services can be improved from a processing standpoint, for example, where operational efficiency and usability of applications/services can be improved through contextual data processing.

SUMMARY

Non-limiting examples described herein relate to representation of intelligent object movement. Examples described herein replace pre-canned object movement actions and provide new data transformations that better emphasize context related to object movement. An action for placement of a data object may be received through a user interface (e.g., of a productivity service). Non-limiting examples of actions comprise a movement of a data object or an object insertion of one or more data objects. The action is analyzed using an object movement data model that evaluates a context for placement of the data object. Insertion characteristics are applied to the data object based on analysis by the object movement data model. A movement of the data object is surfaced, through a user interface, based on the applied insertion characteristics. An exemplary surfaced movement presents a motion animation of the data object from an initial position (e.g., within the digital canvas) to a resting position within the digital canvas. Examples described herein extend to cross-application (or service) usage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 2A-2F illustrate exemplary processing device views associated with user interface examples for intelligent object movement with which aspects of the present disclosure may be practiced.

DETAILED DESCRIPTION

Figure 1:
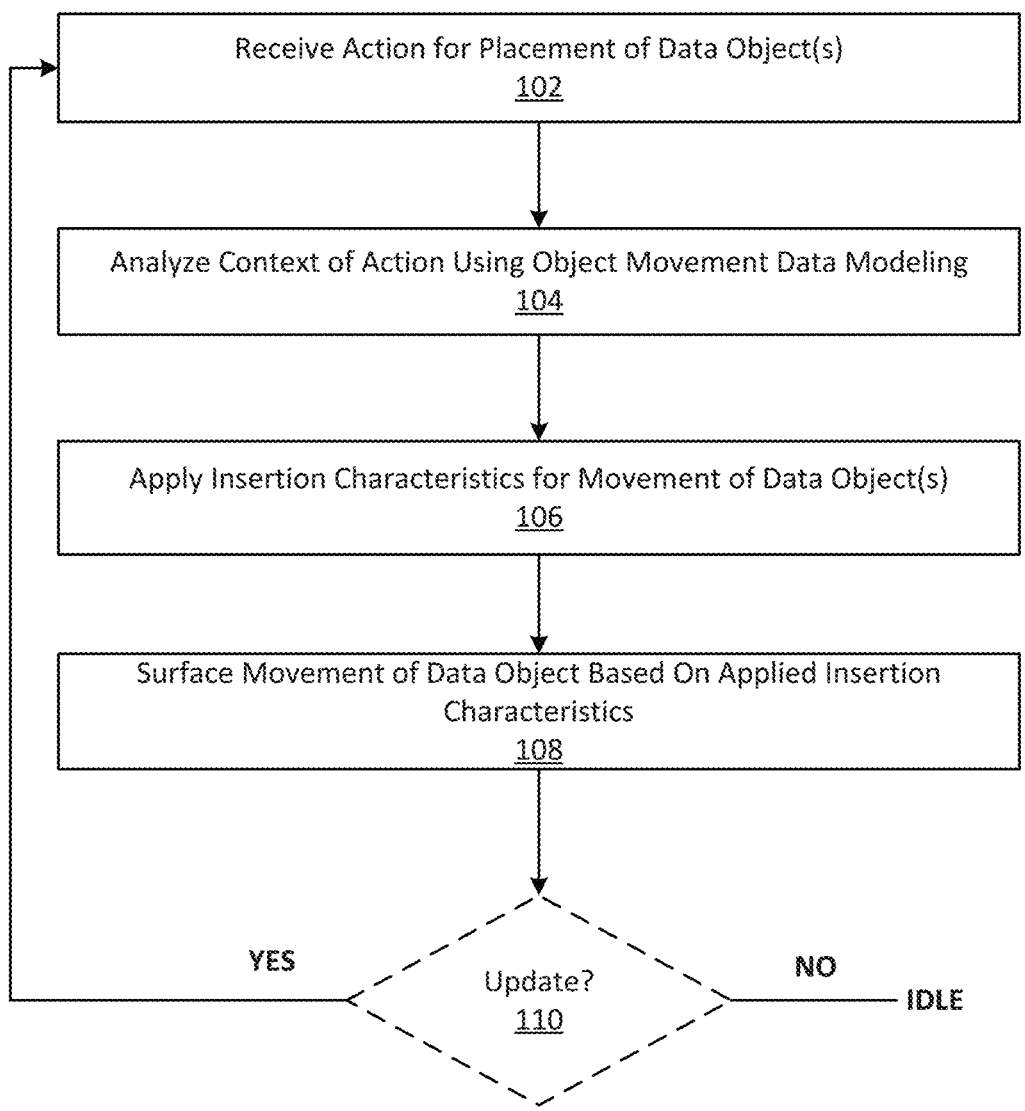
FIG. 1 illustrates an exemplary method related to intelligent object movement with which aspects of the present disclosure may be practiced.

Non-limiting examples described herein relate to representation of intelligent object movement. Examples described herein replace pre-canned object movement actions and provide new data transformations that better emphasize context related to object movement. Non-limiting examples of exemplary actions comprise any movement of the data object(s), for example, within a digital canvas or across applications/services. In one example, an exemplary movement is an object insertion of one or more data objects (including digital documents/files) into a digital canvas of a digital document. The action is analyzed using an exemplary object movement data model that evaluates a context for placement of the data object. An exemplary object movement model is configured to evaluate context (e.g., data object, processing state of a digital document, signal data, etc.) to generate insertion characteristics that are used to provide contextually relevant motion animation for the data object(s). Exemplary insertion characteristics are used to present a motion animation that is tailored for a context of an action for placement of the data object(s). For instance, a motion animation for one type of data object (e.g., single electronic sticky note) may vary from that of another type of object (e.g., stack of electronic sticky notes or files). Insertion characteristics are applied to the data object(s) based on analysis by the object movement data model. A movement of the data object is surfaced, through a user interface, based on the applied insertion characteristics. An exemplary surfaced movement presents a motion animation of the data object from an initial position (e.g., within the digital canvas) to a resting position within the digital canvas. As referenced in the foregoing, examples described herein further extend to cross-application (or service) usage.

Among other technical benefits, operations described herein improve processing efficiency of applications/services through contextual processing and surfacing of contextually relevant data without requiring additional processing to identify and select contextually relevant content. For example, a determined context of an object insertion affects processing executed through an application/service including how an object insertion is presented through a user interface, how many actions are included therein and what data is included in the insertion action, etc. Additionally, processing operations described herein may affect usability of an application/service (e.g., impact through a user interface) when representing object movement through a user interface. For instance, an electronic note file (e.g., sticky note) may be programmed to display differently in one insertion example and be presented completely differently in another.

Further, examples described herein extend to examples where multiple data objects are being moved. For instance, multiple data objects may individually be presented through a user interface and then stacked/layered together, for example, based on analysis of the context associated therewith. Moreover, examples described herein are configured to automatically associate context with data object, for example, when the data object is to be moved within a digital document or across applications/services. Contextual motion animations may be determined and automatically surfaced on behalf of a user.

Analysis by an exemplary object movement data model, may comprise: evaluating a type of data object that is associated with a placement action. Position and height parameters for movement of the data object may be determined. Position and height parameters may correspond to points in time (or frames) for representation of the data object. Positional parameters may comprise an entry position (or initial placement for movement of the data object) as well as a resting position (final positional placement of the data object). In one example, both an entry position and a final resting position may be within the same application/service (e.g., in a digital canvas of a digital document or across different digital canvases). In some instances, an entry position may begin in a first application/service and the final resting position may be in a different application/service. The entry position and the resting position may be linked by motion parameters. Examples of motion parameters comprise but are not limited to: determining velocity parameters for movement of the data object based on the determined position and height parameters. Determination of the velocity parameters comprises calculating a parallel velocity for the data object relative to a surface of the digital canvas and calculating an orthogonal velocity for the data object relative to the surface. Exemplary velocity parameters correspond to the motion of the data object during a motion animation. Furthermore, motion parameters may comprise determining acceleration and deceleration parameters for movement of the data object based on the determined position and height parameters. Determination of acceleration parameters comprises calculating gravitational acceleration based on the determined position and height parameters. Determination of deceleration parameters comprises calculating frictional deceleration parameters based on the determined position and height parameters. Other parameters (including physics-related parameters) may be calculated to affect data transformation, comprise but not limited to: inertia-based parameters, distance traveled, size/mass of data objects/objects, analysis related to number of objects being inserted as well as curve formations (e.g., cubic-bézier functions), among other examples.

Additionally, an exemplary object movement data model may further be configured to analyze signal data to enhance contextual evaluation of a placement action. For instance, signal data may be collected and evaluated for: positional points for movement of a data object(s), data types of data objects, content and positional data for other objects within a digital canvas and signal data related to users (e.g., related to placement action and/or collaboratively associated with the digital canvas). In one instance, a user-specific theme (e.g., single user or group of users) may be generated and applied to tailor a motion animation for a specific user (or group of users). Signal data may be aggregated at any level (e.g., single user, group of users, application/service, by document or channel, etc.).

Other types of parameters analyzed, by an exemplary object movement data model, that may result in insertion characteristics being generated, comprise but are not limited to: a scaling for the data object, a fading for the data object and a drop shadow for the data object. Further, an exemplary object movement data model may be configured to randomize an entry point for insertion of the data object (or objects). In other examples, entry points for insertion of a motion of a data object may be specific to contextual analysis of the request for insertion.

Processing may further be configured to apply insertion characteristics to the data object based on the analysis by the object movement data model. Applied insertion characteristics are used to generate a motion animation that contextually represents the data object (e.g., relative to a context in which the data object is being moved). Insertion characteristics are generated based on any of the above processing by the object movement data model. A representation of the insertion characteristics for the data object may be surfaced, for example, through a user interface of a productivity service. In an example where a placement action is an action to insert a data object into a digital canvas, a surfaced representation of movement of the data object(s) presents a motion animation for the object insertion that comprises a motion animation of the data object from an initial position (with the digital canvas or another application/service) to a resting position within the digital canvas. Non-limiting examples of such representations are illustrated in FIGS. 2A-2F subsequently described.

Further examples described herein extend to collaboration examples. For example, analysis of a context, by the object movement data model, may further comprise identifying that the digital canvas is being collaboratively accessed by two or more users of the productivity service. For instance, when a data object is inserted into a digital canvas, a contact identifier for insertion of the data object may be presented. This may occur for any type of movement of a data object including click and drag instances. As an example, a contact identifier may comprise: an electronic contact card for a user of the productivity service, presence information for the user, metric data related to insertion and/or modifications, comments and message/thread data, among other examples.

Accordingly, the present disclosure provides a plurality of technical advantages, among other benefits, that include but are not limited to: generation, training and implementation of an exemplary service that executes an exemplary object movement data model; achieving image recognition precision and recall enabling generation of contextually relevant data objects for entities of image content; improving scalability for integrating an exemplary object movement data model within different applications/services (e.g., productivity services), improved processing efficiency of computing devices associated with image content (e.g., providing more relevant content retrieval, reduction in processing cycles and latency through minimization of the amount of queries being received, better management of storage/memory of computing devices) for computing devices that are utilized for processing operations described herein; improving cross-application usage and productivity of retrieval-based services (e.g., search engine services); and improved user interaction and productivity with front-end user interfaces and associated applications/services that interface with image content, among other examples.

FIG. 1 illustrates an exemplary method 100 related to intelligent object movement with which aspects of the present disclosure may be practiced. As an example, method 100 may be executed by an exemplary processing device and/or system such as those shown in FIGS. 3-5. In examples, method 100 may execute on a device comprising at least one processor configured to store and execute operations, programs or instructions. Operations performed in method 100 may correspond to operations executed by a system and/or service that execute computer programs, application programming interfaces (APIs), neural networks or machine-learning processing and semantic and entity understanding modeling, among other examples. As an example, processing operations executed in method 100 may be performed by one or more hardware components. In another example, processing operations executed in method 100 may be performed by one or more software components. In some examples, processing operations described in method 100 may be executed by one or more applications/ services associated with a web service that has access to a plurality of application/services, devices, knowledge resources, etc. Processing operations described in method 100 may be implemented by one or more components connected over a distributed network. One or more services (e.g. productivity services) may be configured to execute processing operations described herein including processing operations described in method 100. Processing operations may occur in real-time or near-real-time, among other examples.

Method 100 begins at processing operation 102, where an action for placement of a data object(s) is received. As described in the foregoing, an action for placement of a data object may relate to movement of a data object within a digital canvas of an application/service, across digital canvases/digital documents of the application/service or across different applications/services. One example of an action for placement is an object insertion action that inserts a data object within a digital canvas of an application/service. Another example of an action for placement is re-configuration of positioning for objects displayed within an application/service. As referenced in the foregoing description, examples of an action for placement extend to instances of cross-application (or service) usage. For instance, a user may select a data object in a first application/service and move that data object to another application/service.

An action for placement may be received through a user interface of an application/service such as a productivity service. For instance, a digital canvas of the productivity service may be accessed, where a request for insertion of the data object is received at a specific point within the digital canvas. As an example, a user may be utilizing an application/service and make a service request, through a computing device, for insertion of a data object (or objects). An exemplary request may correspond to a user interface selection of a type of object to be inserted. In some instances, a user interface menu may be presented through the user interface that enables quick insertion of specific data objects. For instance, a user interface menu may present user interface features for insertion actions such as: copy and paste actions, drag and drop actions, insertion of an electronic note file (e.g., electronic sticky note) and insertion of an image or photo, among other examples. However, examples described herein are not so limited and may pertain to user interface features for any type of data object.

A digital canvas may comprise but is not limited to: an electronic file, website, social networking post, word documents, notes, documents, spreadsheet documents, blogs, etc. Further, a digital canvas may comprise already existing content/data objects. For instance, a digital canvas is a working space within a digital document. Examples of data objects comprise but are not limited to: a text object, an image, an electronic note, a photo, audio content, an electronic ink representation, a presentation object, an embedded object, a hyperlink and a grouped object that comprises two or more data objects.

An exemplary application/service is a productivity service. An exemplary productivity application/service is an application/service configured for execution to enable users to complete tasks on a computing device. Examples of productivity services comprise but are not limited to: word processing applications/services, spreadsheet applications/ services, notes/notetaking applications/services, authoring applications/services, digital presentation applications/services, search engine applications/services, email applications/services, messaging applications/services, web browsing applications/services, collaborative team applications/ services, directory applications/services, mapping services, calendaring services, electronic payment services, digital storage applications/services and social networking applications/services, among other examples. In some examples, an exemplary productivity application/service may be a component of a suite of productivity applications/services that may be configured to interface with other applications/ services associated with a platform. For example, a word processing service may be included in a bundled service (e.g., Microsoft® Office365® or the like). Further, an exemplary productivity service may be configured to interface with other internet sources/services including third-party application/services, for example, to enhance functionality of the productivity service.

Flow of method 100 may proceed to processing operation 104, where a context of action for placement is analyzed. An exemplary context is data indicating a current processing state (e.g. current context) of a digital canvas (e.g. digital document) and/or active applications/services, relative to the received action for placement of the data object(s). For instance, different contextual data associated with an action for placement is analyzed to determine insertion characteristics that are used to generate a motion animation for a movement of the data object(s). Exemplary insertion characteristics are used to present a motion animation that is tailored for a context of an action for placement of the data object(s). Examples of contextual data used determination of insertion characteristics comprise but are not limited to: the type of data object (objects), the positional placement of the data object (e.g. to be inserted), other data objects included within the digital canvas, positioning of objects within the digital canvas, relationships between data objects of the digital objects, analysis of content and metadata associated with a digital document (including specific data objects) as well as other signal data (e.g. user-specific data, application/ service data, telemetric data, etc.), among other examples.

A determination of contextual data of the action may comprise identification of an intent for placement of a data object. Intent may be determined through execution of semantic analysis of the action for placement based on application of one or more of: a software-based model, machine-learning model, neural network model, entity data model or the like. For instance, processing operation 104 may comprise applying an exemplary object movement data model to evaluate a context associated with the action for placement, where different contextual aspects for analysis, as identified in the foregoing, may be evaluated to determine insertion characteristics. For instance, a motion animation for one type of data object (e.g., single electronic sticky note) may vary from that of another type of object (e.g., stack of electronic sticky notes or files). Insertion characteristics are applied to the data object(s) based on analysis by the object movement data model.

An exemplary object movement data model is a data model that is trained to evaluate context associated with an action for data object placement. The object movement data model generates exemplary insertion characteristics for surfacing a movement of a data object across one or more application/services. Insertion characteristics are data utilized, through execution of processing operations, to generate a motion animation that is specifically tailored to a context of an action that places a data object (or data objects). Exemplary insertion characteristics may vary on a case-by-case basis depending on the type of data object associated with the action for placement, a context of the digital canvas/digital canvases involved in the placement action and user-specific data relative to the action for placement (e.g., user that inserted data object into a collaborative digital document/digital canvas). Insertion characteristics comprise but are not limited to: parameters for animation, parameters for scaling, parameters for fading, parameters for formatting and layout, parameters for drop shadows, positional parameters (e.g., initial point where an action commences, entry point, resting position and frames in-between, etc.) height parameters, motion parameters (e.g., velocity parameters, acceleration/deceleration parameters), rotational parameters, friction parameters, and size/mass parameters, among other examples. Generation and training of specific data modeling is known to one skilled in the field of art. The exemplary object movement data model may be configured to generate time and/or spatial computations to assist in the generation of parameters for motion animation. Examples of time and/or spatial parameters comprise but are not limited to: time elapsed, time for object movement (e.g., object dropping to a position of the digital canvas), direction, etc.

In one example, exemplary insertion characteristics comprise position/positional and/or height parameters for movement of the data object. Position and height parameters may correspond to points in time (or frames) for insertion of the data object. Positional parameters may comprise an initial position of the movement (e.g., entry position or initial point where the action for placement begins), a resting position (final point of placement of the data object) and frames there-between. In examples, an initial position and a resting position may be within a same application/service or may be across different application/services. The initial position and the resting position may be linked by motion parameters. For example, when a data object is insert, the initial position is typically offset from the final resting position. Exemplary initial positions and resting positions may also be randomized to create unique motion animations. In one example, an exemplary mapping may be generated to link position and/or height parameters to specific frames for movement of a data object. Other exemplary insertion characteristics are subsequently described.

As referenced above, motion parameters may be determined for movement of a data object (or objects). Similar to positional and height parameters, motion parameters may be calculated corresponding to with points in time (or frames) for positional movement of the data object. Examples of motion parameters comprise but are not limited to: determining velocity parameters for movement of the data object based on the determined position and height parameters. Exemplary velocity parameters correspond to the motion of the data object during placement, for example, the speed and direction for object movement, rate of change between frames for object insertion, etc. Determination of the velocity parameters may comprise calculating a parallel velocity for the data object relative to a surface of the digital canvas and/or calculating an orthogonal velocity for the data object relative to the surface. Further velocity computations may comprise lateral velocity parameters and vertical velocity parameters including velocity parameters at various reference points (points in time), frames, etc.

Furthermore, motion parameters may comprise determining acceleration and deceleration parameters for movement of the data object based on the determined position and height parameters. Determination of acceleration parameters comprises calculating gravitational acceleration based on the determined position and height parameters. Determination of deceleration parameters comprises calculating frictional deceleration parameters based on the determined position and height parameters. Other parameters (including physics-related parameters) may be calculated to affect data transformation, comprise but not limited to: inertia-based parameters, size/mass of data objects, analysis related to number of objects being inserted and curve formations (e.g., cubic-bézier functions), among other examples. Examples for determination of specific parameters for insertion characteristics may comprise processing operations that execute floating point operations, evaluation kinematic equations, etc. Such processing operations may be executed by one or more data models, APIs, etc.

Additionally, an exemplary object movement data model may further be configured to analyze signal data to enhance contextual evaluation of an action for placement. For instance, signal data may be collected and evaluated for: insertion points including where an action for placement is initiated/ends, data types, content and positional data for other objects within a digital canvas and signal data related to users (either inserting the data object and/or collaboratively associated with the digital canvas). In one instance, processing operation 104 may comprise identification of collaborative access by two or more different users, which may factor into generation of insertion characteristics for a representation of a data object. As an example, a user-specific theme (e.g., single user or group of users) may be generated and applied to tailor a motion animation for a specific user (or group of users). Signal data may be aggregated at any level (e.g., single user, group of users, application/service, by document or channel, etc.).

Other types of parameters analyzed, by an exemplary object movement data model, that may result in insertion characteristics being generated comprise but are not limited to: a scaling for the data object, a fading for the data object and a drop shadow for the data object. Further, an exemplary object movement data model may be configured to randomize an entry point for insertion of the data object (or objects). In other examples, entry points for insertion of a motion of a data object may be specific to contextual analysis of the action for placement. For instance, the object movement data model determines a type of the data object and an evaluation of the context determines the insertion characteristics based on the type of the data object. In examples, insertion characteristics described above may also utilized to generate specific attributes of a data object motion (over a N number of frames) such as: the scaling of a data object, fading of the data object, rotation of the data object, drop shadow of the data object, among other examples. In some instances, insertion characteristics may vary based on the number of data objects being moved and whether a data object is being grouped with other data objects (e.g. stacked), among other examples.

An exemplary object insertion is now described to provide a non-limiting example of processing by an exemplary object movement data model as described herein. Object insertion is an example of an action for placement. As referenced above, examples described herein may pertain to any movement of data objects and are not limited to object insertion examples.

When an object is inserted, it begins at a position that is offset from its final, resting position. The object insertion is associated with an initial lateral velocity, which is in the direction of the final resting position. The offset direction may be chosen randomly each time a new object is inserted. The object movement data model determines the initial lateral velocity in a direction such that the object is moving towards the final resting position. The object movement data model is configured to evaluate motion animation in two phases. That is, during motion animation, the data object is configured to move to its final resting position in two phases of motion animation. The object movement data model may be configured to employ one or more different data models to determine insertion characteristics for creation of the motion animation. The first phase of motion animation, drops the data object onto the digital canvas. The object movement data model may calculate parameters described herein to generate insertion characteristics for the first phase. In the first phase, the data object is picking up vertical velocity at a constant rate as would occur under a constant gravitational field in the absence of air resistance, while maintaining the same constant lateral velocity. In the second phase of the motion animation, insertion characteristics are computed to have the data object slide along the digital canvas. During such action, the motion animations keeps the data object maintaining the same (zero) distance from the digital canvas but decelerating at a rate (e.g., a constant rate). A distance that the data object moves may be a function of its initial velocity, initial positioning, gravitational acceleration and frictional deceleration. The object movement data model may be configured to determine an initial offset based on such parameters, with principles of motion for the data object as referenced above. In any example, the position of the object is computed as a function of: the initial random orientation, the time elapsed since the start of the motion animation, the initial positioning of the object, the initial lateral velocity, acceleration parameters (e.g., to create constant acceleration representative of gravitational affect), deceleration parameters (e.g., representative of friction). In some instances, parameters may be constants. In order to realize the motion animation, the object movement data model computes the data object's positioning many times each second. The object movement data model is configured to evaluate time elapsed, and decide if it is in the first or second phase of motion, which is decided by computing the amount of time that it takes the object to drop to the digital canvas (e.g., or another alternative movement/motion. The object movement data model may further determine if the time elapsed is less than or more than the time it takes for the object to drop to the digital canvas. If the time elapsed is less than the time of drop for the object, then the height of the object off the canvas is computed using a constant gravitational acceleration model. The objects lateral position is computed assuming a constant lateral velocity. If it is in the second phase of motion, then the object's height is zero and the object's position is computed using a constant lateral deceleration.

Flow may proceed to processing operation 106, where insertion characteristics are applied to the data object based on the analysis by the object movement data model. Insertion characteristics are generated based on any of the above processing by the object movement data model. Processing operation 106 may further comprise randomizing the initial position for placement of the data object (e.g. in the digital canvas). This may create a unique user interface experience for each data object that is moved/inserted into a digital canvas. In some examples, an exemplary digital canvas may be that of a digital document that is collaboratively being accessed (or accessible) by multiple different users. In instances where a document is being collaboratively accessed (or accessible) canvas, a contact identifier for insertion of the data object may be presented. For example, a contact identifier may comprise an electronic contact card for a user of the productivity service, presence information for the user, metric data related to insertion and/or modifications, comments and message/thread data, among other examples.

Processing operation 106 may comprise generating a representation for movement of a data object. An exemplary representation for movement of a data object may pertain to a specific contextual insertion instance that is tailored for a context of the digital canvas. In some examples, an exemplary object movement data model may be pre-programmed for specific insertion examples that may correspond to an evaluation of the determined insertion characteristics. For instance, the object movement data model may execute a threshold analysis of the determined insertion characteristics, and assign specific motion animation processing operations based on the threshold analysis. In such instances, an exemplary movement action may still be tailored specifically for the context of the digital canvas, for instance, through content display, randomized insertion points, etc.

At processing operation 108, movement of the data object is surfaced. As an example, processing operation 108 may comprise surfacing the movement through the user interface of an application/service (e.g., productivity service). An exemplary surfaced movement presents a motion animation of the data object from an initial position (e.g. within the digital canvas) to a resting position within the digital canvas. User interface examples pertaining to motion animation are illustrated in FIGS. 2A-2F subsequently described.

One non-limiting example of a representation for insertion of a data object may comprise the following. A data object randomly enters the digital canvas (e.g., user interface of the productivity service). The data object drops to a surface of the digital canvas with some velocity parallel to the surface and some velocity orthogonal to the surface. During the dropping motion, the velocity parallel to the surface remains constant, the velocity orthogonal to the surface increases constantly (accelerates) in the direction of the surface to simulate gravity. When the data object's distance from the surface becomes zero (i.e. makes contact with the surface of the digital canvas), the orthogonal velocity goes to zero, so that the data object continues to appear to touch the surface of the digital canvas. The velocity parallel to the surface begins to decrease at a constant rate (decelerate) as if to simulate frictional deceleration. This continues until the data object comes to a stop on the surface at a final resting position.

Flow of method 100 may proceed to decision operation 110. At decision operation 110, it is determined whether an update occurs to the digital canvas. Update may comprise a change to one or more data objects (e.g., including an inserted data object in a grouping/stack), receipt of a new request for insertion, among other examples. For instance, a subsequent action for placement may be received that alters the digital canvas of a digital document. In examples where no update occurs, flow of decision operation 110 branches NO and processing of method 100 remains idle until subsequent processing is received. In examples where an update occurs, flow of decision operation 110 branches YES and processing of method 100 returns back to processing operation 102 for evaluation of a new request (or re-evaluation of the data object).

FIGS. 2A-2F illustrate processing device views associated with user interface examples for intelligent object movement with which aspects of the present disclosure may be practiced. User interface examples are shown in association with exemplary productivity applications/services, where processing device views shown in FIGS. 2A-2F are front-end examples of processing operations described in method 100 (FIG. 1). Processing operations supporting the examples shown in FIGS. 2A-2F are described in the foregoing description of method 100 (FIG. 1). It is to be understood that examples described herein are not limited to the visual examples shown in FIGS. 2A-2F. As referenced in the foregoing description, processing operations described herein extend to any type of data object movement, for example, through any type of action for placement of content (including but not limited to content insertion, file insertion, etc.).

Figure 2A:
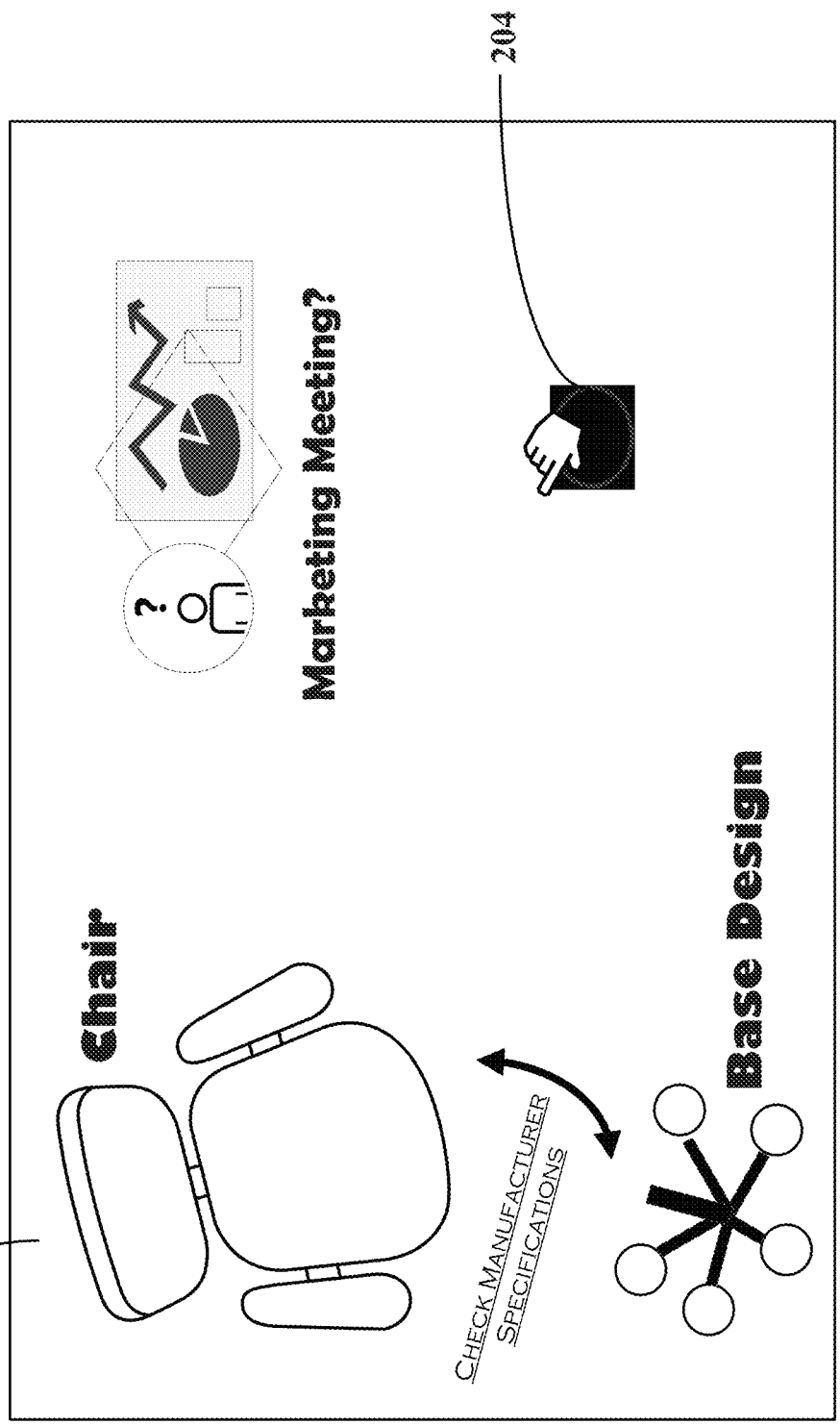

FIG. 2A illustrates processing device view 200, providing a user interface of an exemplary productivity service. For instance, processing device view 200 illustrates a digital canvas 202 of a note-taking service. In the example shown in processing device view 200, a user of the note-taking service is accessing the digital canvas 202 providing a collection of individual notes (e.g. data objects) regarding design and marketing for a chair. The individual notes/data objects are not individually labeled but it is to be understood that processing operations described in method 100 (FIG. 1) may be utilized to understand context of the digital canvas 202. Processing device view 200 illustrates a user executing an action 204 to initiate insertion of an exemplary data object. The action 204 may be a request for insertion of a data object that is received through any type of input via a computing device.

Figure 2B:
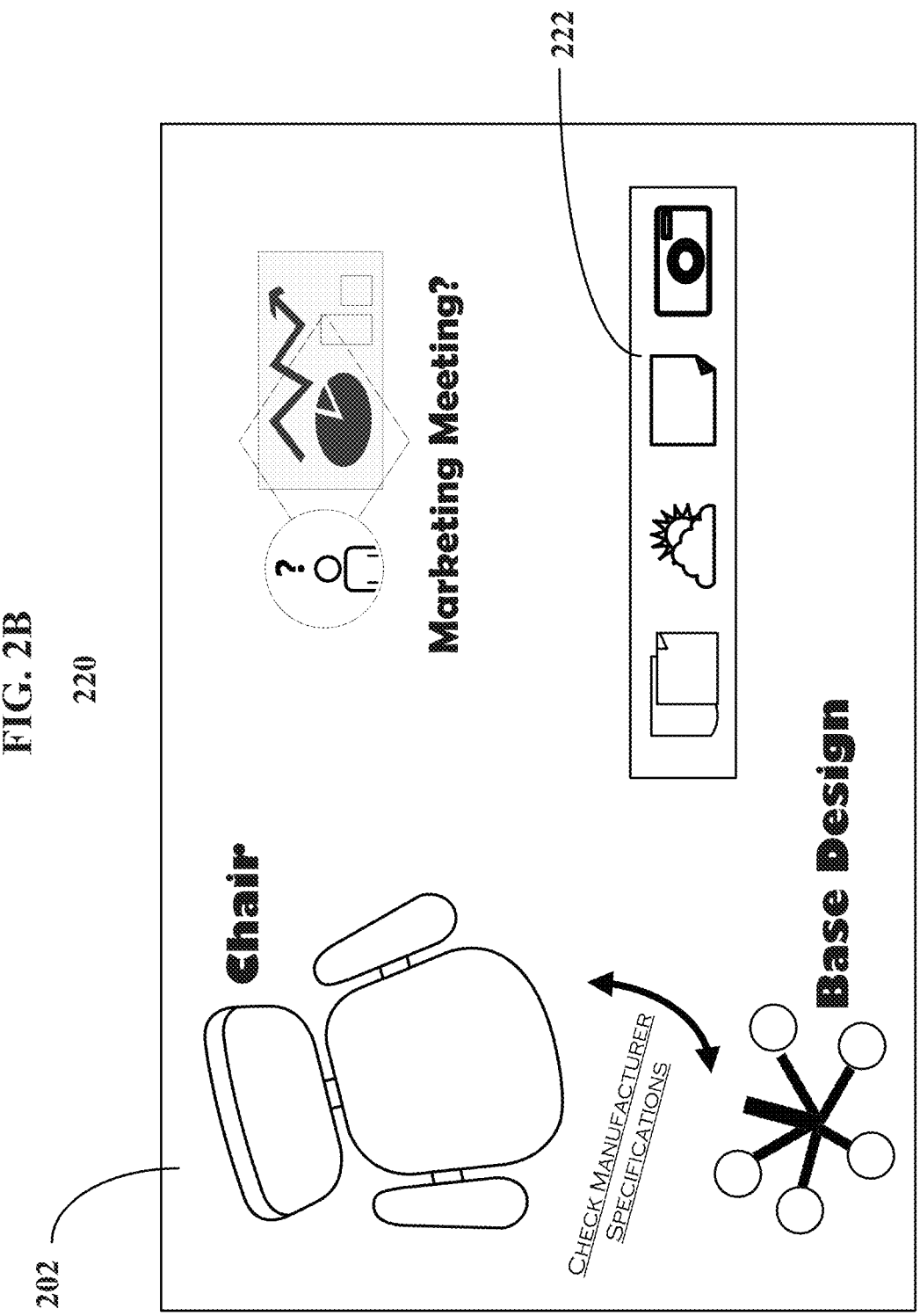

FIG. 2B illustrates processing device view 220, providing a continuing example from the processing shown in processing device view 200 (FIG. 2A). Processing device view 220 illustrates display of a user interface menu 222 providing quick options for object insertion into the digital canvas 202. In some instances, a user interface menu may be presented through the user interface that enables quick insertion of specific data objects. However, examples described herein are not so limited and may pertain to user interface features for any type of data object. In one example, a user interface menu 222 may present user interface features for insertion actions such as: copy and paste actions, drag and drop actions, insertion of an electronic note file (e.g., electronic sticky note) and insertion of an image or photo, among other examples. Corresponding icons for those respective insertion actions are illustrated in processing device view 220, from left to right of the user interface menu 222. In other examples, the user interface menu 222 may be customizable based on the type of application/service that is being worked with. In alternative instances, data objects may be added to the digital canvas 202 through alternative forms of input that directly interact with the digital canvas 202 (e.g., drag and drop actions, copy and paste actions, voice commands, etc.) and through selection of user interface features associated with application command control (e.g., ribbon command control) for the application/service.

Figure 2C:
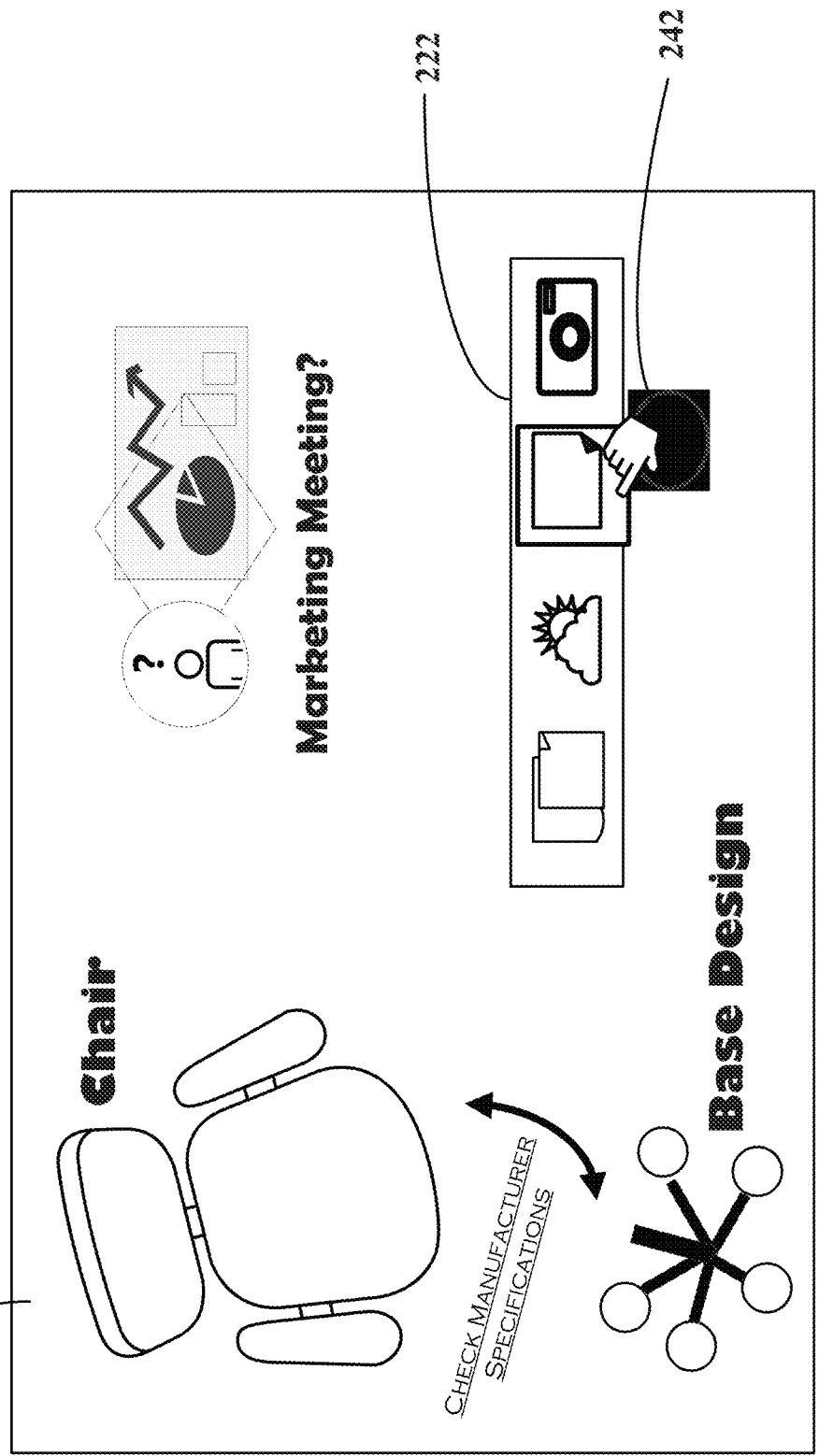

FIG. 2C illustrates processing device view 240, providing a continuing example from the processing shown in processing device view 220 (FIG. 2B). Processing device view 240 illustrates selection of a specific user interface feature from the user interface menu 222. In the example shown, a user selects, by a computing device executing an exemplary note-taking application/service, a user interface feature 242 for insertion of an electronic note file (e.g. electronic sticky note). Exemplary electronic note files are known to one skilled in the field of art.

Figure 2D:
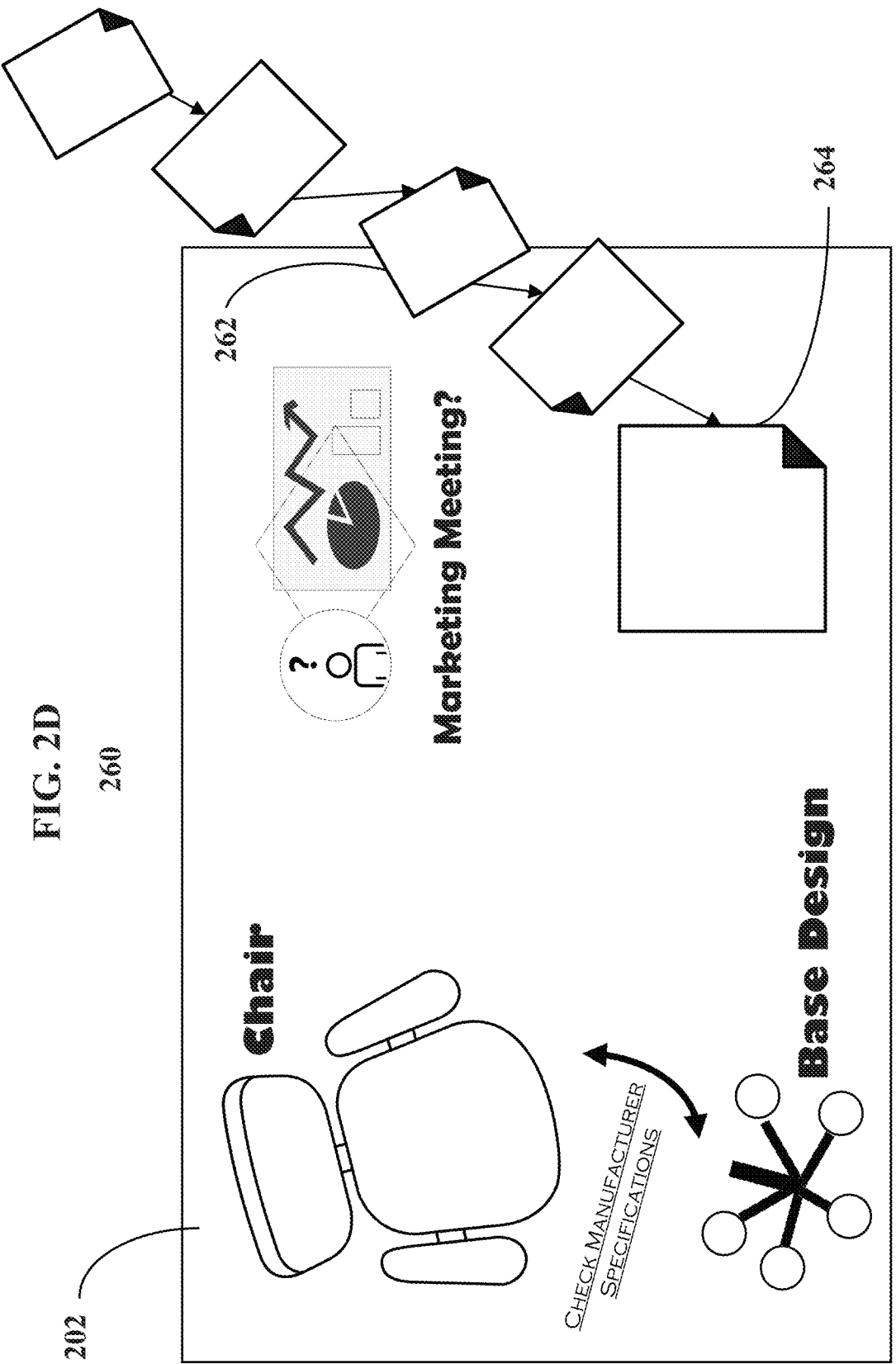

FIG. 2D illustrates processing device view 260, providing a continuing example from the processing shown in processing device view 240 (FIG. 2C). Processing device view 260 illustrates presentation of an exemplary insertion of a data object as described in the foregoing description of method 100 (FIG. 1). An exemplary insertion of a data object is illustrated in two dimensions though it is to be understood that examples are not so limited. Three-dimensional and virtual (3D) embodiments are also intended to be covered by the present disclosure. For instance, an exemplary insertion of a data object (e.g., motion animation) may be three-dimensional, among other examples. An exemplary insertion of a data object may be generated and surfaced based on processing of representation of insertion characteristics. Processing device view 260 illustrates an initial position 262 of the insertion of the data object, for example, being a point in which the insertion of the data object enters the user interface of the note-taking service. It is to be understood that the initial position 262 may vary on a case-by-case basis as the entry position may be randomized as described in the foregoing description. The entry point may be the initial position 262 of the insertion of the data object but that may not always be the case. For instance, an initial position 262 for insertion of the data object may be a point outside of the viewing space of an application/service. As seen in processing device view 260, an exemplary electronic note file is seen falling onto the digital canvas 202, mimicking real-life examples where a sticky note is in the air and fluttering to the ground. The final resting position 264 of the data object is shown as the point in which the data insertion action (e.g., request) is initiated. However, as determined by developers, a final resting position 264 of the data object may vary in different contextual examples.

FIG. 2E illustrates processing device view 270, providing a continuing example from the processing shown in processing device view 260 (FIG. 2D). As can be seen in processing device view 270, the data object remains at the final resting position 264. Subsequent additional layers are illustrated for representation of insertion of the data object. For example, a first content layer 272 is shown that presents contextual content for the electronic note file. The first content layer 272 provides contextual content "Follow-up with Marketing Dept. on Tuesday" as shown in processing device view 270. In one example, the first content layer 272 may be automatically generated on behalf of the user based on the contextual analysis of the digital canvas 202. For instance, a user may have last clicked on the "marketing meeting" data object or just received an email or message with a marketing department for a chair design that the user (or group of users) is working on. Such data may be useful to generate content for an electronic note file that is newly being inserted. In another example, the user may interact with the inserted electronic note file to add the first content layer 272. In some instances, this may occur before the data object is inserted.

Figure 2F:
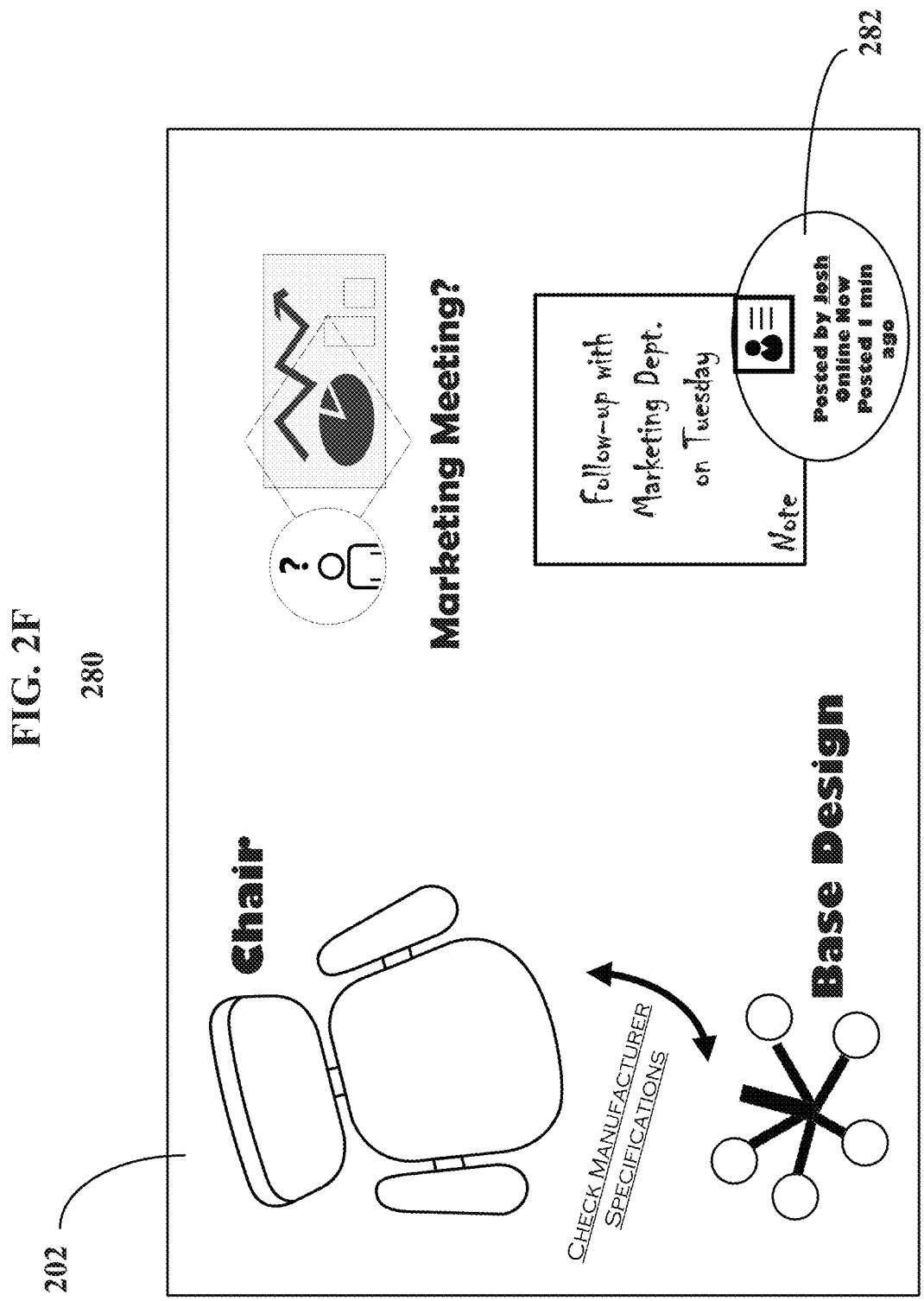

FIG. 2F illustrates processing device view 280, providing a continuing example from the processing shown in processing device view 270 (FIG. 2E). An exemplary object insertion data model may differentiate inserted data objects when the data object is inserted by another user of a digital document from that where a user inserts a data object themselves. Processing device view 280 provides a visual indication of a contact identifier 282 that may accompany a data object inserted into a digital canvas that is collaboratively accessible by more than one user. This instance is one example how the object insertion data model visually indicates that the data object is inserted by another user. In the example shown, the contact identifier 282 indicates that the electronic note file is posted by a user "Josh". The contact identifier 282 may comprise a contact card (full or preview) for the user (Josh) as well as other related data such as: when the data object is inserted, user availability data and notes/comments from users that access the digital canvas 202, among other examples. In alternative instances, other insertion characteristics may be specifically altered in collaborative insertion instances including but not limited to: fading, drop-shadows, animation, sound/video effects and manipulation of size/shape of the data object, among other examples.

Figure 3:
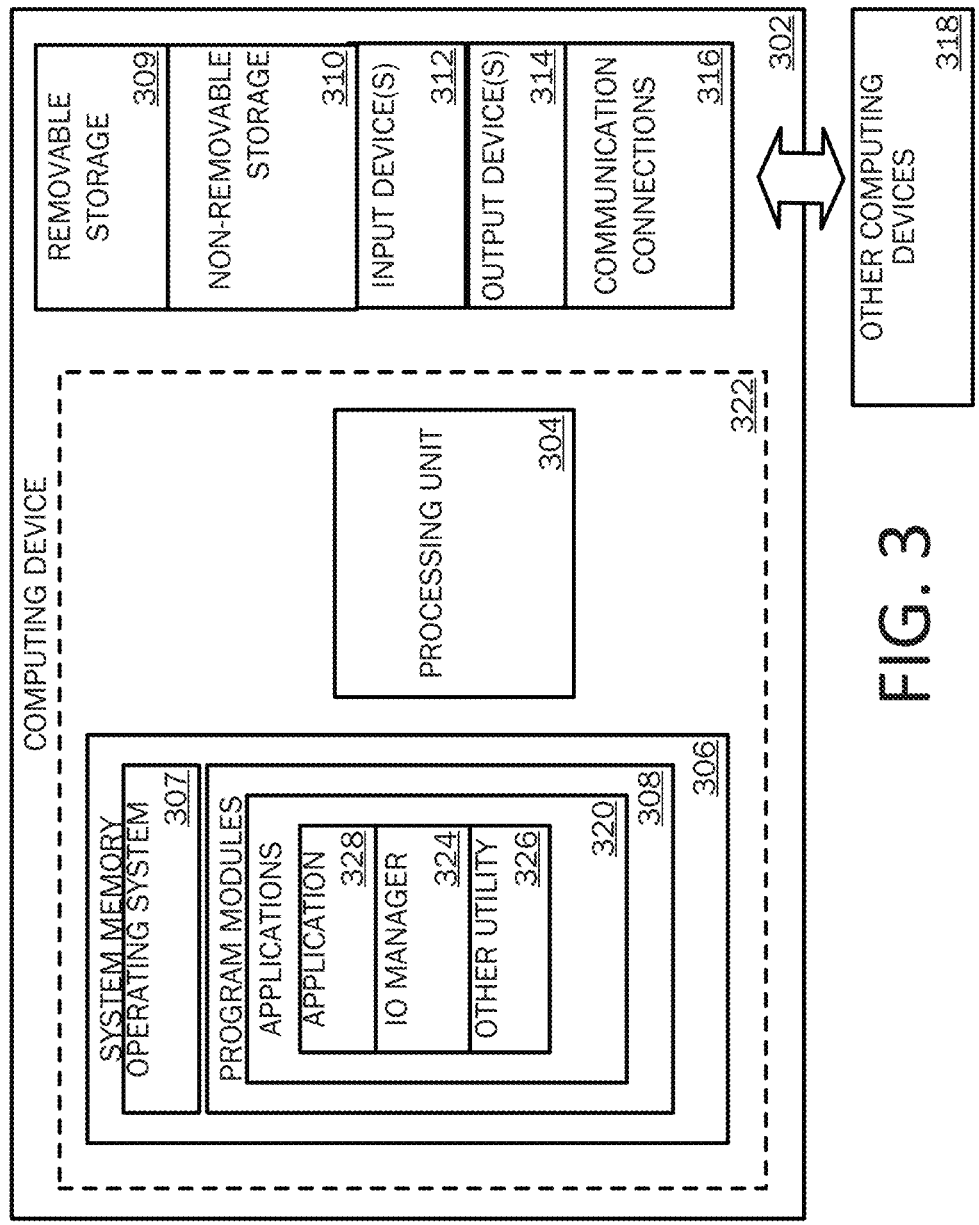
FIG. 3 is a block diagram illustrating an example of a computing device with which aspects of the present disclosure may be practiced.
Figure 4A:
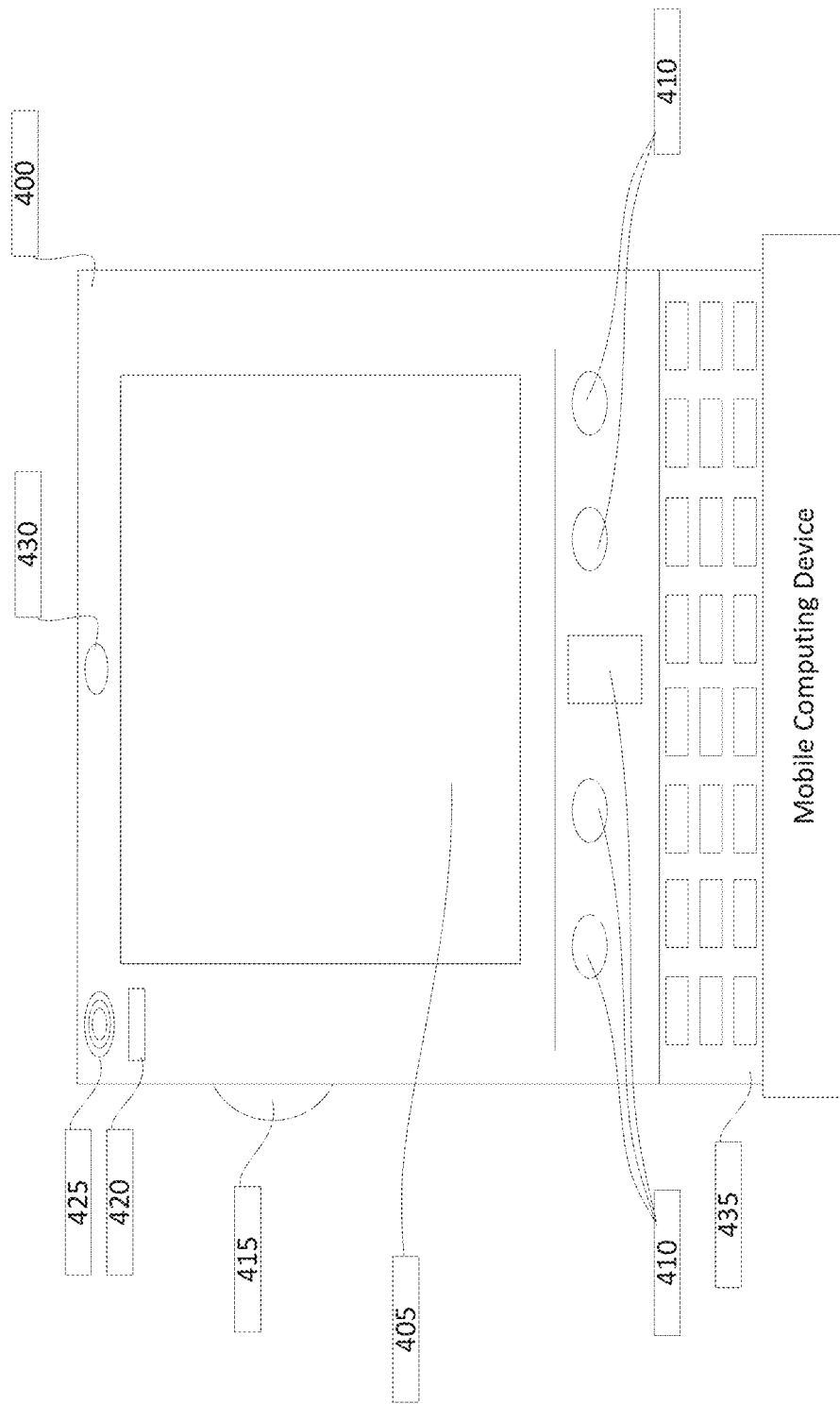
FIGS. 4A and 4B are simplified block diagrams of a mobile computing device with which aspects of the present disclosure may be practiced.
Figure 4B:
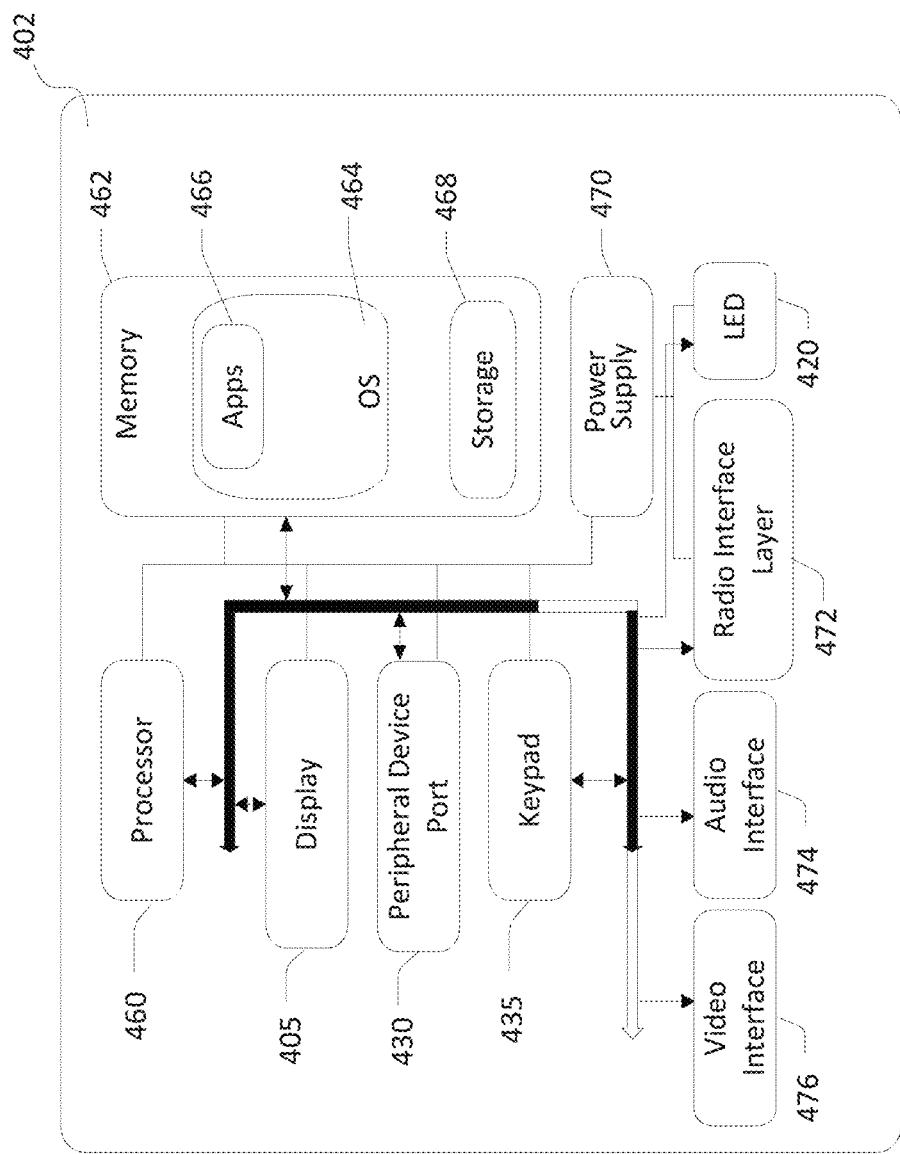
Figure 5:
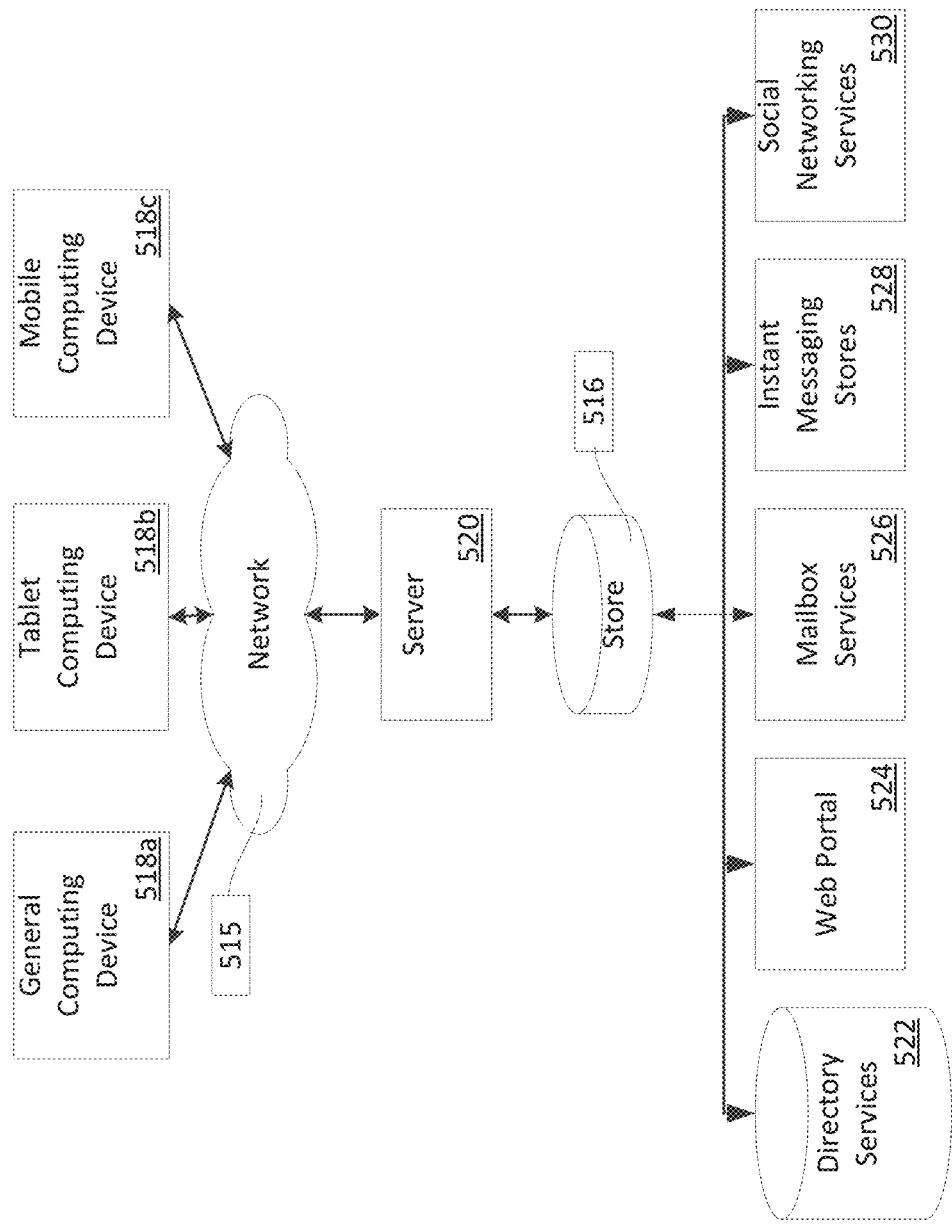
FIG. 5 is a simplified block diagram of a distributed computing system in which aspects of the present disclosure may be practiced.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for contextual object movement as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 306. While executing on the processing unit 304, program modules 308 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 302 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for contextual object movement as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for contextual object movement as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
receiving, through a user interface, an action for placement of a data object within a digital canvas of a productivity service;
applying a trained data model configured to execute machine learning processing that automatically generates a motion animation sequence for the data object that consecutively executes a first motion animation phase and a second motion animation phase, wherein the applying of the trained data model executes processing operations that comprise:
determining a final resting position of the data object for the motion animation sequence,
selecting a random offset direction relative to the final resting position for the motion animation sequence,
determining the entry point for the motion animation of the data object based on the random offset direction relative to the final resting position, and
setting, based on analysis of the entry point, the offset direction and the final resting position, both of:
a first set of motion parameters associated with a first motion animation phase that drops the data object from the entry point toward the digital canvas, and
a second set of motion parameters for a second motion animation phase that moves the data object along the digital canvas immediately after a drop action is executed in the first motion animation phase; and
surfacing, through the user interface, the motion animation sequence that consecutively presents the first motion animation phase applied to the data object and the second motion animation phase applied to the data object.

2. The method of claim 1, wherein the setting further comprises automatically determining insertion characteristics for each of the first motion animation phase and the second motion animation phase, and wherein the insertion characteristics comprise velocity parameters determined by: calculating, for each of the first motion animation phase and the second motion animation phase, a parallel velocity for the data object relative to a surface of the digital canvas and calculating, for each of the first motion animation phase and the second motion animation phase, an orthogonal velocity for the data object relative to the surface.

3. The method of claim 1, wherein the setting further comprises automatically determining insertion characteristics for each of the first motion animation phase and the second motion animation phase, and wherein the insertion characteristics comprise acceleration parameters determined by: calculating, for each of the first motion animation phase and the second motion animation phase, parameters for gravitational acceleration based on position and height parameters for motion of the data object.

4. The method of claim 1, wherein the trained data model is further configured to determine a type of the data object, and wherein attributes associated with the type of the data object are used to determine values associated with the first set of motion parameters and the second set of motion parameters.

5. The method of claim 1, wherein the trained data model determines a user-specific theme for the motion animation sequence of the data object based on an evaluation of user-specific signal data received through the productivity service, and wherein the surfacing presents the motion animation sequence based on the user-specific theme.

6. The method of claim 1, wherein the action for placement of the data object is a selection of a user interface element, provided through the user interface, that is configured to add the data object within the digital canvas, and wherein the applying the trained data model occurs based on a trigger of the receiving of the selection of the user interface element.

7. The method of claim 1, wherein the setting further comprises automatically determining insertion characteristics for each of the first motion animation phase and the second motion animation phase, and wherein the insertion characteristics comprise: position and height parameters for movement of the data object, velocity parameters for movement of the data object based on the position and height parameters, acceleration parameters for movement of the data object, and deceleration parameters for movement of the data object.

8. A system comprising:
at least one processor; and
a memory, operatively connected with the at least one processor, storing computer-executable instructions that, when executed by the at least one processor, causes the at least one processor to execute a method that comprises:
receiving, through a user interface, an action for placement of a data object within a digital canvas of a productivity service;
applying a trained data model configured to execute machine learning processing that automatically generates a motion animation sequence for the data object that consecutively executes a first motion animation phase and a second motion animation phase, wherein the applying of the trained data model executes processing operations that comprise:
determining a final resting position of the data object for the motion animation sequence,
selecting a random offset direction relative to the final resting position for the motion animation sequence,
determining the entry point for the motion animation of the data object based on the random offset direction relative to the final resting position, and
setting, based on analysis of the entry point, the offset direction and the final resting position, both of:
a first set of motion parameters associated with a first motion animation phase that drops the data object from the entry point toward the digital canvas, and
a second set of motion parameters for a second motion animation phase that moves the data object along the digital canvas immediately after a drop action is executed in the first motion animation phase; and
surfacing, through the user interface, the motion animation sequence that consecutively presents the first motion animation phase applied to the data object and the second motion animation phase applied to the data object.

9. The system of claim 8, wherein the setting further comprises automatically determining insertion characteristics for each of the first motion animation phase and the second motion animation phase, and wherein the insertion characteristics comprise velocity parameters determined by: calculating, for each of the first motion animation phase and the second motion animation phase, a parallel velocity for the data object relative to a surface of the digital canvas and calculating, for each of the first motion animation phase and the second motion animation phase, an orthogonal velocity for the data object relative to the surface.

10. The system of claim 8, wherein the setting further comprises automatically determining insertion characteristics for each of the first motion animation phase and the second motion animation phase, and wherein the insertion characteristics comprise acceleration parameters determined by: calculating, for each of the first motion animation phase and the second motion animation phase, parameters for gravitational acceleration based on position and height parameters for motion of the data object.

11. The system of claim 8, wherein the trained data model is further configured to determine a type of the data object, and wherein attributes associated with the type of the data object are used to determine values associated with the first set of motion parameters and the second set of motion parameters.

12. The system of claim 8, wherein the trained data model determines a user-specific theme for the motion animation sequence of the data object based on an evaluation of user-specific signal data received through the productivity service, and wherein the surfacing presents the motion animation sequence based on the user-specific theme.

13. The system of claim 8, wherein the setting further comprises automatically determining insertion characteristics for each of the first motion animation phase and the second motion animation phase, and wherein the insertion characteristics comprise: position and height parameters for movement of the data object, velocity parameters for movement of the data object based on the position and height parameters, acceleration parameters for movement of the data object, and deceleration parameters for movement of the data object.

14. A computer-readable storage medium storing computer-executable instructions that, when executed by at least one processor, causes the at least one processor to execute a method comprising:
receiving an indication of an action for placement of a data object within a digital canvas of a productivity service;
applying a trained data model configured to execute machine learning processing that automatically generates a motion animation sequence for the data object that consecutively executes a first motion animation phase and a second motion animation phase, wherein the applying of the trained data model executes processing operations that comprise:
determining a final resting position of the data object for the motion animation sequence, selecting a random offset direction relative to the final resting position for the motion animation sequence, determining the entry point for the motion animation of the data object based on the random offset direction relative to the final resting position, and setting, based on analysis of the entry point, the offset direction and the final resting position, both of:

a first set of motion parameters associated with a first motion animation phase that drops the data object from the entry point toward the digital canvas, and a second set of motion parameters for a second motion animation phase that moves the data object along the digital canvas immediately after a drop action is executed in the first motion animation phase; and transmitting, for display through a user interface of the productivity service, data for rendering of the motion animation sequence that consecutively presents the first motion animation phase applied to the data object and the second motion animation phase applied to the data object.

15. The computer-readable storage medium of claim 14, wherein the setting further comprises automatically determining insertion characteristics for each of the first motion animation phase and the second motion animation phase, and wherein the insertion characteristics comprise velocity parameters determined by: calculating, for each of the first motion animation phase and the second motion animation phase, a parallel velocity for the data object relative to a surface of the digital canvas and calculating, for each of the first motion animation phase and the second motion animation phase, an orthogonal velocity for the data object relative to the surface.

16. The computer-readable storage medium of claim 14, wherein the setting further comprises automatically determining insertion characteristics for each of the first motion animation phase and the second motion animation phase, and wherein the insertion characteristics comprise acceleration parameters determined by: calculating, for each of the first motion animation phase and the second motion animation phase, parameters for gravitational acceleration based on position and height parameters for motion of the data object.

17. The computer-readable storage medium of claim 14, wherein the trained data model is further configured to determine a type of the data object, and wherein attributes associated with the type of the data object are used to determine values associated with the first set of motion parameters and the second set of motion parameters.

18. The computer-readable storage medium of claim 14, wherein the trained data model determines a user-specific theme for the motion animation sequence of the data object based on an evaluation of user-specific signal data received through the productivity service, and wherein the surfacing presents the motion animation sequence based on the user-specific theme.

19. The computer-readable storage medium of claim 14, wherein the indication of the action for placement of data object is data indicating a selection of a user interface element, through the user interface of the productivity service, configured to add the data object within the digital canvas, and wherein the applying the trained data model occurs based on a trigger of the receiving of the indication.

20. The computer-readable storage medium of claim 14, wherein the setting further comprises automatically determining insertion characteristics for each of the first motion animation phase and the second motion animation phase, and wherein the insertion characteristics comprise: position and height parameters for movement of the data object, velocity parameters for movement of the data object based on the position and height parameters, acceleration parameters for movement of the data object, and deceleration parameters for movement of the data object.

* * * * *